United States Patent
Sugiyama et al.

(10) Patent No.: US 8,558,428 B2
(45) Date of Patent: Oct. 15, 2013

(54) WINDINGLY LAMINATED CORE OF ROTARY ELECTRIC MACHINE INCLUDING AN ADJUSTMENT UNIT CORE AND MANUFACTURING METHOD THEREOF

(75) Inventors: Toshiya Sugiyama, Okazaki (JP); Yasutoshi Yamada, Chita-gun (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 265 days.

(21) Appl. No.: 12/971,836

(22) Filed: Dec. 17, 2010

(65) Prior Publication Data
US 2011/0175486 A1 Jul. 21, 2011

(30) Foreign Application Priority Data

Jan. 19, 2010 (JP) .................................. 2010-008871

(51) Int. Cl.
*H02K 1/06* (2006.01)

(52) U.S. Cl.
USPC ...... 310/216.041; 310/216.046; 310/216.047; 310/216.063

(58) Field of Classification Search
USPC .................. 310/216.041, 216.043, 216.048, 310/156.53, 216.046, 216.047, 216.063; 29/596
See application file for complete search history.

(56) References Cited

U.S. PATENT DOCUMENTS

| 7,378,774 B2 | 5/2008 | Torii et al. |
| 2007/0046125 A1* | 3/2007 | Torii et al. ................ 310/156.53 |
| 2008/0201936 A1 | 8/2008 | Hoshino et al. |

FOREIGN PATENT DOCUMENTS

| JP | 2007-68310 | 3/2007 |
| JP | 2009195099 A | * 8/2009 |
| JP | 2009273202 A | * 11/2009 |

OTHER PUBLICATIONS

Machine Translation JP2009273202 (2009) and JP2009195099 (2009).*

* cited by examiner

*Primary Examiner* — Tran Nguyen
*Assistant Examiner* — Jose Gonzalez Quinones
(74) *Attorney, Agent, or Firm* — Oblon, Spivak, McClelland, Maier & Neustadt, L.L.P.

(57) ABSTRACT

A windingly laminated core of a rotary electric machine, having a first number of magnetic poles in total and configured by unit cores, each of which is formed in an arc and thin plate shape and has a second number of magnetic poles, wherein a winding lamination is applied to the unit cores in a circumferential direction and in a spiral manner so as to form a cylindrical shape and a lamination thickness in an axial direction of the winding lamination is set to a predetermined thickness, includes an adjustment unit core having magnetic poles whose number is less than the second number, wherein the adjustment unit core is arranged at a start or an end of the winding lamination, in a circumferential direction, in order to align a rotational phase of the start of the winding lamination to a rotational phase of the end of the winding lamination.

14 Claims, 5 Drawing Sheets

WINDINGLY LAMINATED CORE OF ROTARY ELECTRIC MACHINE INCLUDING AN ADJUSTMENT UNIT CORE AND MANUFACTURING METHOD THEREOF

CROSS REFERENCE TO RELATED APPLICATIONS

This application is based on and claims priority under 35 U.S.C. §119 to Japanese Patent Application 2010-008871, filed on Jan. 19, 2010, the entire content of which is incorporated herein by reference.

TECHNICAL FIELD

This disclosure relates to a laminated core used for rotary electric machines such as a power generator, an electric motor and the like, and also relates to a windingly laminated core configured by plate materials that are windingly laminated in a spiral manner and a manufacturing method of the winding laminated core.

BACKGROUND DISCUSSION

A rotary electric machine such as a power generator, an electric motor or the like generally uses a laminated core formed by laminating thin plate materials such as magnetic steel sheets. At the laminated core, a coil is wound around respective projecting pole portions or permanent magnets are embedded therein, and such laminated core is applied at a rotor, a stator or the like. In a manufacturing process of the laminated core, a predetermined number of plate materials, formed in an annular shape by means of punching, are laminated in an axial direction of the laminated core. Because a thickness of each plate material may vary, the laminated core is manufactured in such a way that plate materials are laminated so as to reach a target lamination thickness of the laminated core, not on the basis of a target number of the plate materials to be used, and the number of the plate materials to be used for forming the laminated core is controlled to be increased or decreased so as to reach the target lamination thickness of the laminated core. Further, instead of using the annular shaped plate materials having relatively low yield rates, arc shaped unit cores, each corresponding to a part of the annular shaped plate material and having high yield rate, are formed, and a windingly laminated core is produced by arranging the arc shaped unit cores so as to be windingly laminated in a circumferential direction and in a spiral manner.

JP2007-68310A discloses an example of the windingly laminated core. The windingly laminated core disclosed in JP2007-68310A, having a first number of magnetic poles in total, is configured by a predetermined number of unit cores that are windingly limited, each of the unit cores formed in an arc shape and having a second number of magnetic poles, the second number being a natural number except for an aliquot part of the first number. The predetermined number of unit cores are partially connected to each other at an outer circumferential surface thereof. The partially connected unit cores are windingly laminated continuously to form the windingly laminated core, thereby reducing the time required for manufacturing the core. Further, because the number of the magnetic poles to be provided at each of the unit cores is the second number that is not an aliquot part of the first number, contacting surface positions at which the unit cores are contacting each other in a circumferential direction are not aligned in an axial direction of the core, in other words, the unit cores are formed in a staggeringly windingly laminated core, in which a mechanical strength is relatively high.

According to the windingly laminated core disclosed in JP2007-68310A, when the predetermined number of unit cores are windingly laminated in such a way that a rotational phase of a start of a winding lamination is aligned to a rotational phase of an end of the winding lamination, because of differences of plate thicknesses of the unit cores, the lamination thickness of the windingly laminated core may not reach a predetermined thickness. Even when the number of the unit cores is adjusted in order to reach the predetermined lamination thickness, the rotational phase of the start of the winding lamination may not be aligned to the rotational phase of the end of the winding lamination, which means the windingly laminated core includes different numbers of unit cores and different lamination thicknesses in a circumferential direction. Such windingly laminated core is not suitable for practical use of the rotor because a level of a balance around an axis of the core is reduced. In this circumstance, additional unit cores are arranged so as to be windingly laminated in order to exceed the predetermined thickness and to align the rotational phase of the start of the winding lamination and the rotational phase of the end of the winding lamination. However, in a case where a large number of windingly laminated cores are manufactured, a lamination thickness of each of the cores may vary within (second number −1) number at a maximum, and further, because the lamination thickness of the windingly laminated core substantially exceeds the predetermined thickness, a length of the rotary electric machine in an axial direction thereof may be increased. Furthermore, the used amount of the plate materials is increased.

JP2007-68310A also discloses that, in order to align the rotational phases of the first and the end of the winding lamination, an adjustment unit core, formed so as to have a third number of magnetic poles, is arranged at the start or the end of the winding lamination, the third number being a natural number smaller than the second number, however, a manufacturing method of the adjustment unit core is not disclosed in JP2007-68310A.

A need thus exists to provide a windingly laminated core of a rotary electric machine and a manufacturing method thereof, which is not susceptible to the drawback mentioned above.

SUMMARY

According to an aspect of this disclosure, a windingly laminated core of a rotary electric machine, having a first number of magnetic poles in total, the first number being a natural number that is dividable by two, and configured by a plurality of unit cores, each of which is formed in an arc and thin plate shape and has a second number of magnetic poles, the second number being a natural number except for an aliquot part of the first number and being less than the first number and being equal to or more than three, wherein a winding lamination is applied to the unit cores in a circumferential direction and in a spiral manner so as to form a cylindrical shape and a lamination thickness in an axial direction of the winding lamination is set to a predetermined thickness, includes an adjustment unit core formed in the arc and thin plate shape and having at least one of magnetic poles whose number is less than the second number, wherein the adjustment unit core is provided so as to be adjacent to the unit core, arranged at at least one of a start and an end of the winding lamination, in a circumferential direction, in order to align a rotational phase of the start of the winding lamination so as to correspond to a rotational phase of the end of the winding lamination.

According to another aspect of this disclosure, a manufacturing method of a windingly laminated core of a rotary electric machine, the windingly laminated core having a first number of magnetic poles in total, the first number being a natural number that is dividable by two and configured by a plurality of unit cores formed in an arc and thin plate shape, each of which having a second number of magnetic poles, the second number being a natural number except for an aliquot part of the first number and being less than the first number and being equal to or more than three, wherein a winding lamination is applied to the unit cores in a circumferential direction and in a spiral manner so as to form a cylindrical shape, and a lamination thickness in an axial direction of the winding lamination is set to a predetermined thickness, includes a unit core forming process in which the plurality of unit cores are formed, a windingly laminating process in which the winding lamination is applied to the unit cores in the circumferential direction and in the spiral manner and a phase adjusting process in which, after the lamination thickness of the winding lamination reaches the predetermined thickness, a rotational phase of the start of the winding lamination is aligned to a rotational phase of the end of the winding lamination by use of an adjustment unit core formed in the arc and thin plate shape and having at least one of magnetic poles whose number is less than the second number.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
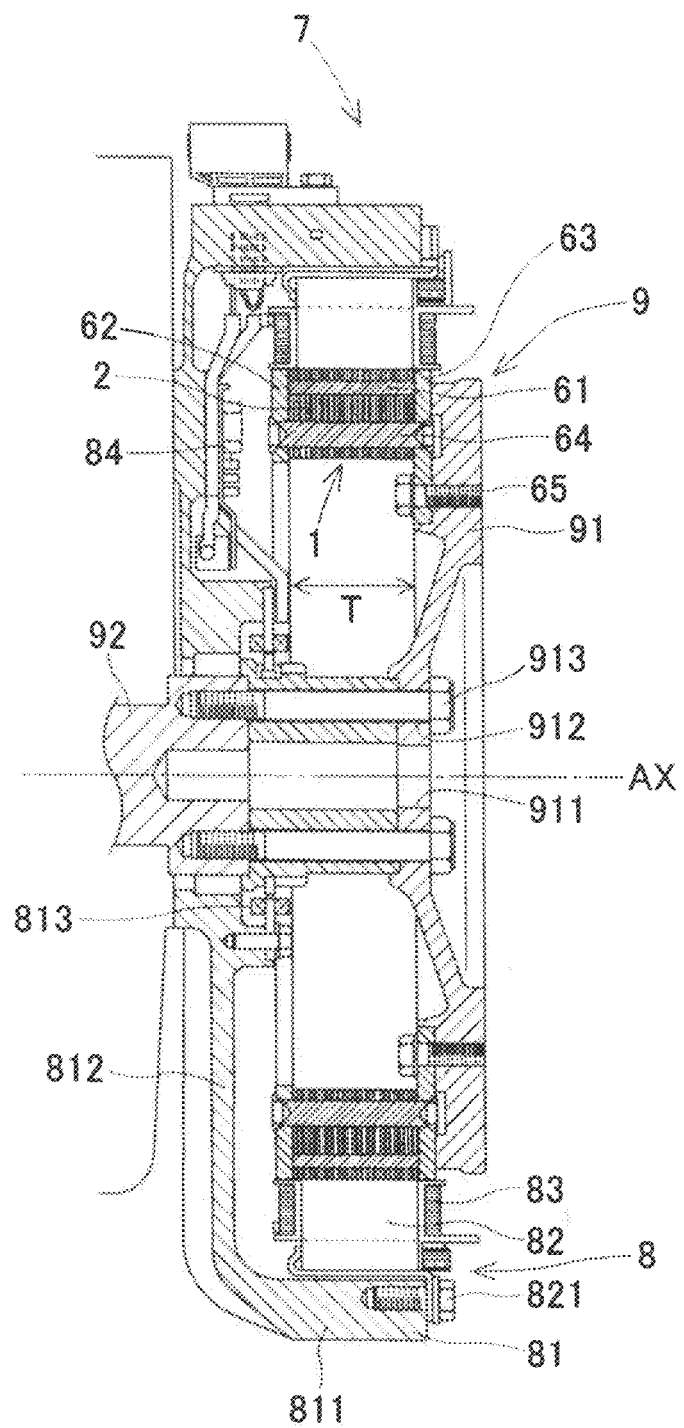
FIG. 1 is a cross sectional view of an electric motor in which a windingly laminated core of a rotary electric machine of embodiments is applied to a rotor.
Figure 2:
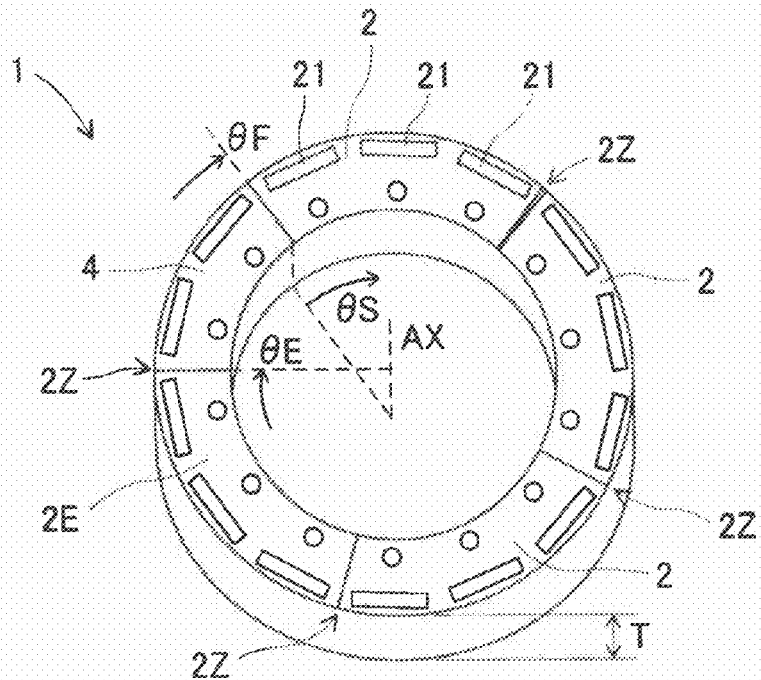
FIG. 2 is a diagram for schematically explaining the windingly laminated core of the embodiments.

An embodiment of this disclosure will be explained in accordance with FIGS. 1 and 2. FIG. 1 is a cross section of an electric motor 7, in which a windingly laminated core 1, applied to a rotor 9 according to embodiments of this disclosure, is used. The electric motor 7 is configured by a stator 8, the rotor 9 and the like so as to be approximately axisymmetrically-supported relative to an axis line AX, wherein the stator 8 is provided at a radially outer portion of the electric motor 7 and the rotor 9 is provided at a radially inner portion of the electric motor 7. The stator 8 is configured by a stator attaching frame 81, a stator core 82, a stator coil 83 and a control circuit 84. The stator attaching frame 81 is formed with a cylinder portion 811, formed in a cylinder shape and arranged at a most radially outer portion of the stator attaching frame 81, and an annular portion 812, formed in an annular shape by bending so as to extend from an end portion of the cylinder portion 811 (a left end portion of the cylinder portion 811 in FIG. 1) radially inwardly in a radial direction of the stator attaching frame 81. A bearing 813 is provided in the vicinity of a center through hole of the annular portion 812 in order to support a rotating shaft 92 so as to be freely rotatable. At an inner circumferential surface of the stator attaching frame 81, the stator core 82 formed in an approximate annular shape is attached by means of a plurality of attachment bolts 821. The stator core 82 is formed with the stator coil 83 being wound in a radial direction the stator 8. The control circuit 84 is provided at an inside (a right side in FIG. 1) of the annular portion 812 of the stator attaching frame 81. The controls circuit 84 adjusts electricity inputted to the stator coil 83 so that a rotation of the electric motor 7 is controlled.

The rotor 9 is configured by a rotor supporting frame 91, the rotating shaft 92, the windingly laminated core 1 and the like. The rotor supporting frame 91, formed in an approximate disc shape, is connected to the rotating shaft 92 at a radially inner portion of the rotor 9 and is supporting the windingly laminated core 1 at a radially outward portion of the rotor 9. Specifically, the rotor supporting frame 91 of the rotor 9 is formed with a center through hole 911 and a plurality of attachment through holes 912. The center through hole 911, formed relative to an axis line AX, is used for centering the rotor 9 relative to the stator 8, and the attachment through holes 912 are formed around the center through hole 911. The rotor supporting frame 91 is connected to the rotating shaft 92 so as to be integrally rotatable by means of attachment bolts 913 each of which inserted through each attachment through hole 912 from the right thereof in FIG. 1 and screwed into a respective bore formed at the rotating shaft 92.

The windingly laminated core 1 of the embodiments in this disclosure is configured by a plurality of unit cores 2, a plurality of permanent magnets 61, two end plates 62 and 63 and a plurality of sleeves 64. Each of the unit cores 2, formed in an arc and thin plate shape, is formed so as to include an attachment through hole 21 for the permanent magnet and a through hole 22. The unit cores 2 are arranged in a circumferential direction so as to be windingly laminated in a spiral manner, thereby forming a winding lamination of the unit cores 2 (e.g., a unit coil) whose lamination thickness in the axis line AX is a predetermined thickness T. Hereinafter the winding lamination of the unit cores 2 will be simply referred to as a winding lamination. When the unit cores 2 are arranged so as to be windingly laminated in the spiral manner to form the winding lamination, the attachment through holes 21 of the unit cores 2 that are contacting to each other in the axis line AX direction are arranged so as to penetrate in the axis line AX direction, and the permanent magnet 61 is to be embedded into the penetratingly arranged attachment through holes 21. At both ends of the winding lamination, the end plates 62 and 63 are provided, respectively. Each of the sleeves 64 is arranged so as to pass through the through holes 22 of the winding lamination and the end plates 62 and 63, A caulking is applied to both ends of each sleeve 64 so as to press both of the end plates 62 and 63 in a direction getting close to each other, thereby the unit cores 2 forming the winding lamination are closely contact with each other within the lamination. The end plate 63 provided at the right in FIG. 1 is fixed to the rotor supporting frame 91 of the rotor 9 by means of a plurality of attachment bolts 65.

The windingly laminated core 1 will be further explained. FIG. 2 is a schematic diagram for explaining the windingly laminated core 1 of the embodiments of this disclosure. Each of the unit cores 2, formed in the arc and thin plate shape, is produced by punching a plate material such as a magnetic steel sheet or a silicon steel sheet whose thickness is approximately 0.35 mm. As shown in FIG. 2, a total number of magnetic poles (e.g., a variable number "n", a first number), set at the windingly laminated core 1, serving as the rotor 9, is fourteen, specifically, seven pairs of magnetic poles are formed at the windingly laminated core 1. Each of the unit cores 2 is formed with three attachment through holes 21, in other words a number of magnetic poles set at each of the unit cores 2 (e.g., a variable number "m", a second number) is three. According to the embodiment, five unit cores 2 (first, second, third, fourth and fifth unit cores 2) are arranged in a circumferential direction so as to form a full circle, wherein the fifth unit core 2 partially overlaps the first unit core 2 at a portion corresponding to a single magnetic pole. Specifically, the unit cores 2 are windingly laminated in a spiral manner by making the full circle by the five unit cores 2 in such a way that the last one-third segment, having a single magnetic pole, of the fifth unit core 2 overlaps a first one-third segment, having a single magnetic pole, of the first unit core 2, and then another five unit cores 2 are arranged in the same manner so as to form the winding lamination in the spiral manner, and the winding lamination is executed several times. From several dozen sheets up to several hundred sheets of the unit cores 2 are windingly laminated to form the winding lamination until a lamination thickness thereof in the axis line AX direction reaches the predetermined thickness T.

The thickness of each plate material used for forming each of the unit cores 2 includes a tolerance therebetween, and in the embodiment, the plate material includes a tolerance of ±5%. For this reason, the number of the unit cores 2, used for forming the windingly laminated core 1, needs to be increased or decreased so as to reach the predetermined thickness T of the winding lamination in the axis line AX direction. Because the unit cores 2 are windingly laminated in a spiral manner by making a full circle by five unit cores 2 in such a way that the last one-third segment, having a single magnetic pole, of the fifth unit core 2 overlaps the first one-third segment of the first unit core 2, when the unit cores 2 are windingly laminated to form the winding lamination until the lamination thickness thereof in the axis line AX direction reaches the predetermined thickness T, a rotational phase of an end of the winding lamination may be aligned to a rotational phase of the start of the winding lamination or may not be aligned to the rotational phase of the start of the winding lamination by one-third segment corresponding to one magnetic pole or two-third segment corresponding to two magnetic poles. In an example illustrated in FIG. 2, the winding lamination is executed in a clockwise direction in such a way that a rotational phase of the start of the winding lamination is set to a rotational phase θS, and a rotational phase of the end of the winding lamination at a last unit core 2E is set to a rotational phase θE. In this example, a two-third segment, corresponding to two magnetic poles, of the unit core 2 is short to reach the rotational phase θS of the start of the winding lamination. In order to align the end of the winding lamination to the start of the winding lamination, an adjustment unit core 4, formed in an arc and thin shape and having two magnetic poles, is arranged so as to be adjacent to the last unit core 2E in the circumferential direction. In this configuration, the rotational phase θE is advanced by the two magnetic poles so as to reach a rotational phase θF, so that the end of the winding lamination is aligned at the rotational phase θF to the rotational phase θS of the start of the winding lamination.

In another example where the rotational phase θE of the end of the winding lamination is not aligned to the rotational phase θS of the start of the winding lamination by one-third segment corresponding to one magnetic pole, in order to align the rotational phase of the end of the winding lamination to the rotational phase of the start of the winding lamination, the adjustment unit core 4, formed in an arc and thin shape and having one magnetic pole, is arranged so as to be adjacent to the last unit core 2E in the circumferential direction. In this configuration, the rotational phase θE is advanced by the one magnetic pole so as to align at the rotational phase θF, so that the end of the winding lamination is aligned at the rotational phase θF to the rotational phase θS of the start of the winding lamination. In a case where the position of the start of the winding lamination is aligned to the position of the end of the winding lamination, no adjustment unit core is provided. Accordingly, in any cases, the rotational phase θF of the end of the winding lamination is adjustable to be aligned to the rotational phase θS of the start of the winding lamination.

According to the windingly laminated core 1 of the rotary electric machine of the embodiment mentioned above, because the thickness of each plate material used for forming each of the unit cores 2 includes a tolerance, the number of the unit cores 2 to be used for forming the windingly laminated core 1 is increased or decreased in order to achieve the predetermined thickness T of the winding lamination. However, even when the rotational phase θS of the start of the winding lamination is not aligned to the rotational phase θE of the end of the winding lamination, by use of the adjustment unit core 4, the rotational phase of the end of the winding lamination may be advanced to the rotational phase θF at which the end of the winding lamination is aligned to the rotational phase θS. A thickness to be controlled to form the lamination may be reduced to a plate thickness of the single unit core 2, thereby reducing the increment of the length of the electric motor in the axis line AX direction. Further, the windingly laminated core 1 may be balanced relative to the axis line AX because the rotational phase θS of the start of the winding lamination and the rotational phase θF of the end of the winding lamination are aligned to each other by use of the adjustment unit core 4, without providing additional unit cores 2 to be windingly laminated in order to reach the predetermined thickness T, as in the known motor, thereby reducing the number of the unit cores 2 to be used.

As mentioned above, fourteen magnetic poles are to be set at the windingly laminated core 1, and three magnetic poles are set at each of the unit cores 2, and because "fourteen" and "three" are prime numbers, contacting surface positions 2Z, at which each of the unit cores 2 contacts to each other in the circumferential direction, are arranged so as to be misaligned by one-third segment, corresponding to one magnetic pole, between adjacent laminations in the axis line AX direction. In this structure, the contacting surface positions 2Z, at which the strength of the winding lamination may be reduced, are aligned in a minimal number in an axis of the winding lamination (the axis line AX). Specifically, in a case where a plurality of unit cores having four magnetic poles are used for forming the windingly laminated core 1 whose total number of the magnetic poles is fourteen, although "four" magnetic poles of the unit core is not an aliquot of "fourteen" magnetic poles of the windingly laminated core 1, because "four" and "fourteen" have a common divisor of two, start counting at the start of the winding lamination, the contacting surface positions are intensively arranged at magnetic pole border phases of even numbers, and the contacting surface positions are not arranged at magnetic pole border phases of odd numbers. Accordingly, a level of the mechanical strength at the magnetic pole border phases of even numbers may be reduced compared to the embodiment of this disclosure.

Figure 3:
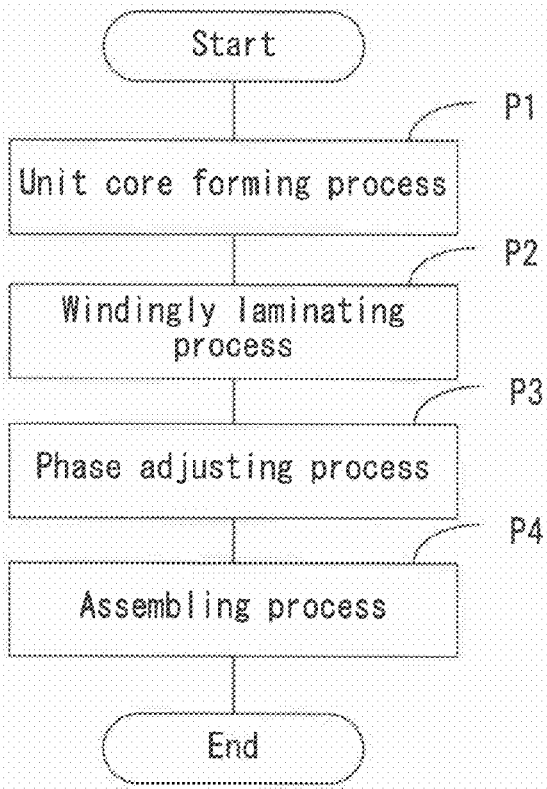
FIG. 3 is a process flow chart for explaining a manufacturing method of the windingly laminated core of the rotary electric machine of a first embodiment.
Figure 4:
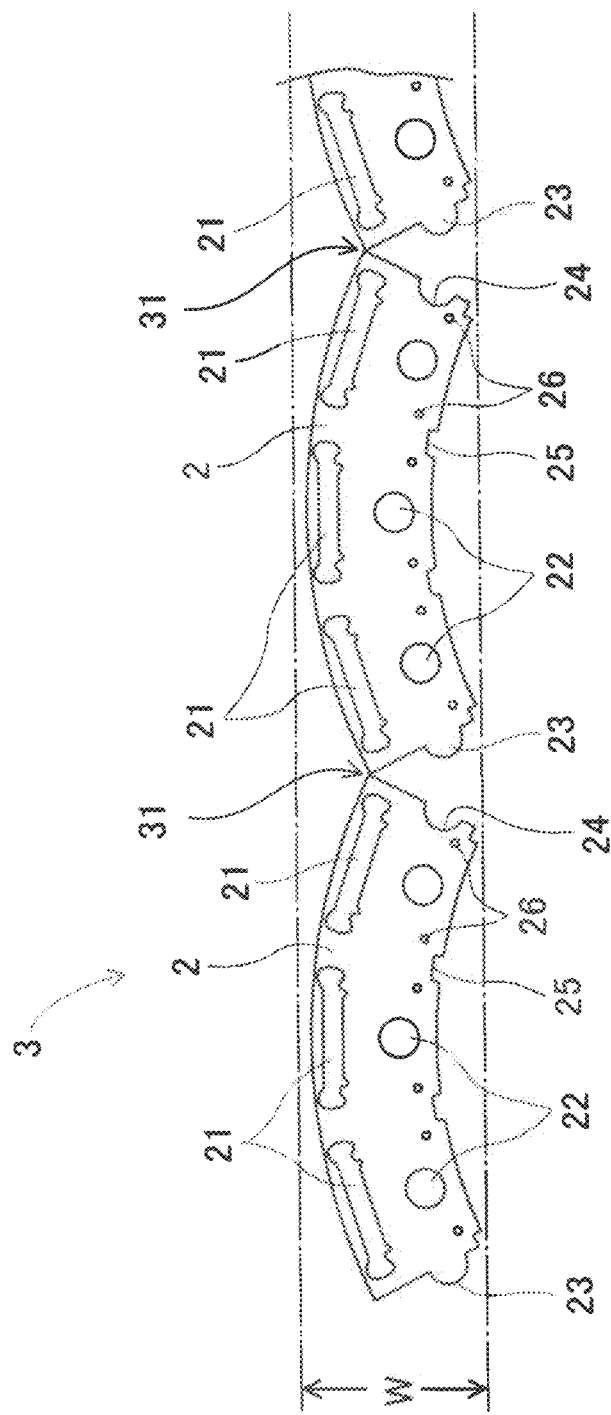
FIG. 4 is a diagram for explaining a series of unit cores produced in a unit core forming process of the first embodiment.

A first embodiment of a manufacturing method of the windingly laminated core 1 will be explained. FIG. 3 illustrates a process chart for explaining the manufacturing method of the windingly laminated core 1 of the rotary electric machine of the first embodiment. The manufacturing method of the windingly laminated core 1 of the first embodiment includes four processes; a unit core forming process P1, a windingly laminating process P2, a phase adjusting process P3 and an assembling process P4. In the first embodiment, a series of unit cores 3 being partially connected to each other at an outer circumferential surface is firstly formed, and the series of unit cores 3 is windingly laminated. In the unit core forming process P1, the series of unit cores 3 illustrated in FIG. 4 is formed in order to form the plurality of unit cores 2. FIG. 4 is a diagram for explaining the series of unit cores 3 formed in the unit core forming process P1. As indicated in FIG. 4, the series of unit cores 3 is formed in such a way that the unit cores 2 are arranged in a line, where the unit cores 2 are partially connected to each other at a connecting portion 31 on the outer circumferential surface of each of the unit cores 2. The series of unit cores 3 is formed by repeatedly punching a plate material whose width is set to a width W. A length of the connecting portion 31 in a radial direction is generally set to 1 mm through 3 mm on the basis of a plate thickness of the plate material, the total number "n" of the magnetic poles set at the rotor 9 and a diameter of the rotor 9.

A semicircular shaped projecting portion 23 is formed at one end in a circumferential direction of each of the unit cores 2, and a semicircular shaped recessed portion 24 is formed at the other end in the circumferential direction of the each of the unit cores 2. The semicircular shaped projecting portion 23 and the semicircular shaped recessed portion 24 are formed in such a way that the semicircular shaped projecting portion 23 smoothly and tightly engages adjacent semicircular shaped recessed portion 24 when the unit cores 2 are windingly laminated. The semicircular shaped projecting portion 23 and the semicircular shaped recessed portion 24 may be formed in other shapes such as a triangular shape, for example the semicircular shaped projecting portion 23 and the semicircular shaped recessed portion 24 may be formed so as to have a taper, as long as a level of magnetic resistance of magnetic path formed between the adjacent unit cores 2 can be lowered. Further, three attachment through holes 21 are concyclically formed so as to correspond to three magnet poles formed on each of the unit cores 2, and through holes 22 into which the sleeves 64 are respectively mounted are formed. The position of each of the through holes 22 may be set so as to be separated from the attachment through holes 21 as far as possible and yet keeping a mechanical strength. As shown in FIG. 4, the through holes 22 are formed at a radially inward of the attachment through holes 21 so as to be separated therefrom.

Figure 5:
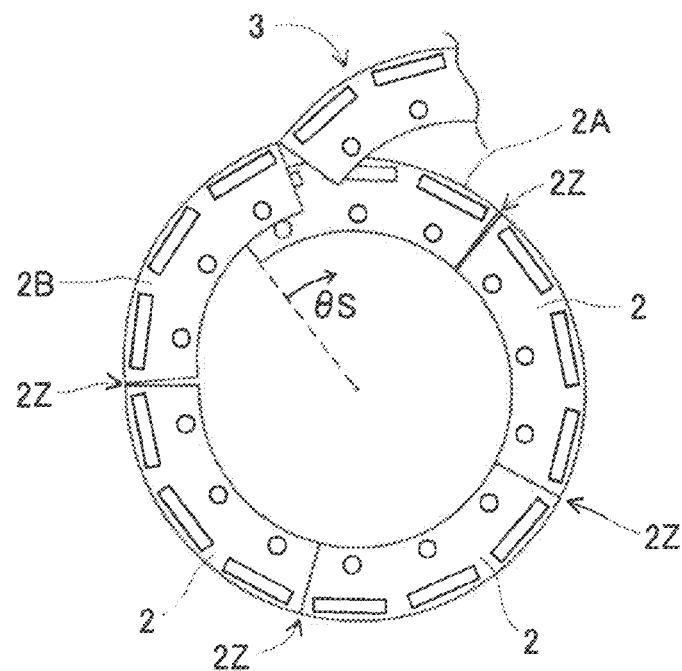
FIG. 5 is a schematic diagram for explaining a start of the winding lamination of the series of unit cores in a windingly laminating process of the first embodiment.

At an inner circumferential surface of the unit core 2, recessed portions 25 are formed in an approximately trapezoidal shape. In the windingly laminating process P2 described later, the series of unit cores 3 formed in a strip shape is smoothly wound around a frame with engaging at the recessed portions 25, so that the operation of the winding lamination 2 may be easier. The recessed portions 25 are formed at positions where a level of the strength around each of the through holes 22 that receives the centrifugal force generated along with the rotation of the rotor 9 may not be reduced, for example, on a line connecting a center of the adjacent through holes 22 to the center of the arc of the unit core. Further, on the unit core 2 at both sides of the each of the through holes 22 in the circumferential direction and slightly radially inward of each of the through holes 22, protruding portions 26 are formed by a half die cutting. The protruding portions 26 are used for positioning the unit cores 2 accurately in the windingly laminating process P2, and the laminated state of the unit cores 2 are maintained by caulking at the protruding portions 26. The protruding portions 26 are formed at positions where magnetic resistance of the unit cores 2 are not influenced, and where a mechanical strength of the windingly laminated core 1 may not be influenced. Next, in the windingly laminating process P2, the series of unit cores 3 are arranged so as to be windingly laminated in the circumferential direction and in the spiral manner. FIG. 5 is a diagram for schematically explaining the start of the winding lamination of the series of unit cores 3 in the windingly laminating process P2. As indicated in FIG. 5, the series of unit cores 3 is windingly laminated in a clockwise direction while setting a start unit core 2A of the series of unit cores 3 to the rotational phase θS that is the start of the winding lamination. At this point, the unit cores 2 are arranged in the circumferential direction in such a way that the projecting portions 23 indicated in FIG. 4 are closely engaged with the recessed portions 24, respectively. The series of unit cores 3 is wound so as to make a full circle ending at the two-third segment, corresponding to the second magnetic pole, of a fifth unit core 23, and one-third segment, corresponding to the third magnetic pole, of the fifth unit core 2B exceeds the full circle, The one-third segment corresponding to the third magnetic pole of the fifth unit core 2B is arranged so as to overlap the one-third segment corresponding to the first magnetic pole of the start unit core 2A, and then the series of unit cores 3 is continuously windingly laminated in the spiral manner.

Further, as the unit cores 2 are windingly laminated in the axis line AX, the protruding portions 26 illustrated in FIG. 4 are aligned to the protruding portions 26 of the unit core 2 arranged immediately below thereof, and a caulking is applied to the protruding portions 26, accordingly the attachment through holes 21 and the through holes 22 of the unit cores 2 are finely aligned in the axis of the winding lamination (the axis line Ax). In a case where the series of unit cores 3 runs out to achieve the predetermined thickness T of the windingly laminated cores 2, another series of unit cores 3 may be additionally used so as to continue the winding lamination. The series of unit cores 3 is windingly laminated until the lamination thickness in the axis of the winding lamination (in the axis line AX) reaches the predetermined thickness T.

Figure 6:
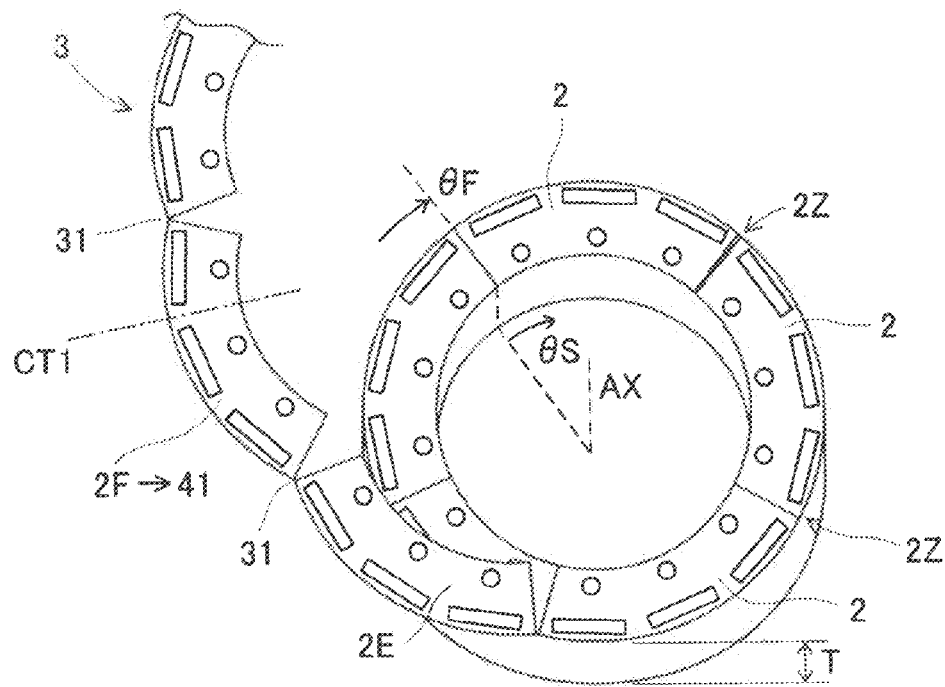
FIG. 6 is a schematic diagram for explaining a phase adjusting method executed at an end of the winding lamination in a phase adjusting process of the first embodiment.

After the lamination thickness reaches the predetermined thickness T, the phase adjusting process P3 is executed if needed in order to align the rotational phase of the start of the winding lamination and a rotational phase of an end of the winding lamination by use of the adjustment unit core. In the first embodiment, the adjustment unit core is a out unit core 41 formed by cutting a unit core 2F. FIG. 6 is a diagram for schematically explaining a phase adjustment method applied to the end of the winding lamination in the phase adjusting process P3. In the example of FIG. 6, after the series of unit cores 3 is windingly laminated so as to reach the predetermined thickness T, the unit core 2F is arranged so as to exceed the rotational phase θS of the start of the winding lamination by last one-third segment corresponding to one magnetic pole of the unit core 2F. In this case, cutting is applied to the unit core 2F at a cutting line CT1, corresponding to the position of the rotational phase θS of the start of the winding lamination, by means of a press cutter in order to form the cut unit core 41. Accordingly, the rotational phase θS of the start of the winding lamination and the rotational phase θF of the end of the winding lamination are aligned.

After the series of unit cores 3 is windingly laminated so as to reach the predetermined thickness T, in a case where the unit core 2F is arranged so as to exceed the rotational phase θS of the start of the winding lamination by the two-third segment, corresponding to the two magnetic poles, of the unit core 2F, the position of the cutting line CT is changed to a position corresponding to the rotational phase θS of the start of the winding lamination. In a case where the rotational phase of the end of the winding lamination of the unit core 2F is aligned to the rotational phase θS of the start of the winding lamination, the unit core 2F may be cut at the connecting portion 31. Generally, in a case where the number of magnetic poles of each of the unit cores is the variable number "m", a unit core arranged at the end of the winding lamination may be cut at a position at which zero through "m−1" magnetic poles are remained in the winding lamination.

In the last assembling process P4, after the unit cores 2 are windingly laminated so as to form a cylindrical shape, the plurality of permanent magnets 61 are inserted into the attachment through holes 21, respectively, the attachment through holes 21 being aligned in the axis line AX direction. Then, the end plate 62 is provided so as to contact one end of the winding lamination in the axis of the winding lamination (the axis line AX direction), and the end plate 63 is provided so as to contact the other end of the winding lamination in the axis of the winding lamination (the axis line AX direction). In this configuration, the sleeves 64 are inserted into the through holes 22 of the winding lamination and the end plates 62 and 63, and a caulking is applied to both ends of each sleeve 64 in the direction of the axis line AX, thereby completing the windingly laminated core 1. The windingly laminated core 1 is fixed to the rotor supporting frame 91 by means of the plurality of the attachment bolts 65.

According to the manufacturing method of the windingly laminated core 1 of the first embodiment, when the lamination thickness of the unit cores 2 reaches the predetermined thickness T, only in a case where the rotational phase of the end of the winding lamination is not aligned to the rotational phase of the start of the winding lamination, the unit core 2F is cut at one location, which means, because the windingly laminated core 1 is manufactured by cutting the unit core 2F at one location only in a case where the rotational phase of the end of the winding lamination is not aligned to the rotational phase of the start of the winding lamination, the manufacturing process may be simplified, while reducing the manufacturing cost. Further, compared to a case where plural pieces of the unit cores, which are not connected to each other, are arranged piece by piece so as to be windingly laminated, according to the first embodiment, because the series of unit cores 3, in which the plurality of unit cores 2 are connected to each other, are windingly laminated, the manufacturing process may be simplified, and the manufacturing time may be reduced, while also reducing the manufacturing cost.

A second embodiment of the manufacturing method of the windingly laminated core 1 will be explained. In the second embodiment, the series of unit cores 3 is windingly laminated in the similar way to the first embodiment, however, the manufacturing method of the adjustment unit core and usage of the adjustment unit core are different from that of the first embodiment. Specifically, in the second embodiment, the unit core forming process, the windingly laminating process and the assembling process are identical to those of the first embodiment, and the phase adjusting process are different from that of the first embodiment. The manufacturing method of the second embodiment further includes an adjustment unit core forming process in which an adjustment unit core is formed in advance.

Figure 7A:
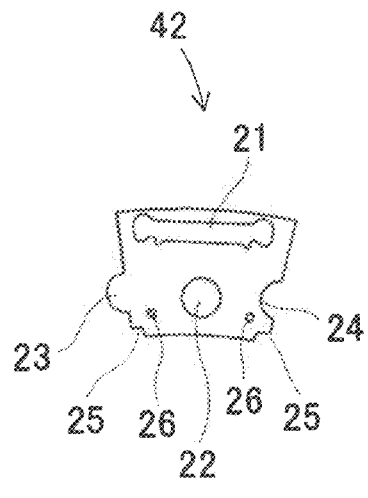
FIG. 7A is a diagram for explaining one example of an adjustment unit core produced in an adjustment unit core forming process of a second embodiment and indicating a unit core having one pole.
Figure 7B:
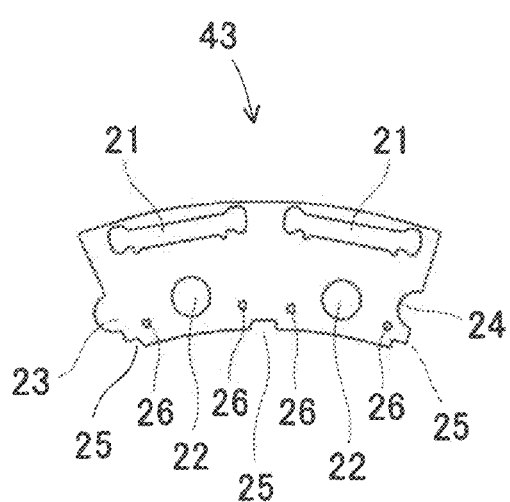
FIG. 7B is a diagram for explaining another example of the adjustment unit core produced in the adjustment unit core forming process of the second embodiment and indicating a unit core having two poles.

The adjustment unit core forming process needs to be executed before the phase adjusting process and may be executed before or after the unit core forming process and the windingly laminating process. FIGS. 7A and 7B are diagrams for explaining an adjustment unit core produced in the adjustment unit core forming process of the second embodiment. FIG. 7A illustrates a unit core having one pole 42 and FIG. 7B illustrates a unit core having two poles 43, As indicated in FIG. 7A, the unit core having one pole 42 is an adjustment unit core corresponding to one magnetic pole having one of the attachment through holes 21, and as indicated in FIG. 7B, the unit core having two poles 43 is an adjustment unit core corresponding to two magnetic poles having two of the attachment through holes 21, Each of the unit core having one pole 42 and the unit core having two poles 43 is produced by punching a plate material such as a magnetic steel sheet or a silicon steel sheet whose thickness is approximately 0.35 mm, which is identical to the material used for producing the series of unit cores 3. Each of the unit core having one of the poles 42 and the unit core having two of the poles 43 is individually formed so as not to include the connecting portion 31 and includes the semicircular shaped projecting portion 23 and the semicircular shaped recessed portion 24 in the same manner as the series of unit cores 3. Both of the unit cores 42 and 43 are produced basically in the same manner as the unit cores 2, however, the unit core having one pole 42 includes one of the through holes 22, two of the recessed portions 25 and two of the protruding portions 26, and the unit core having two of the poles 43 includes two of the through holes 22, three of the recessed portions 25 and four of the protruding portions 26.

Figure 8:
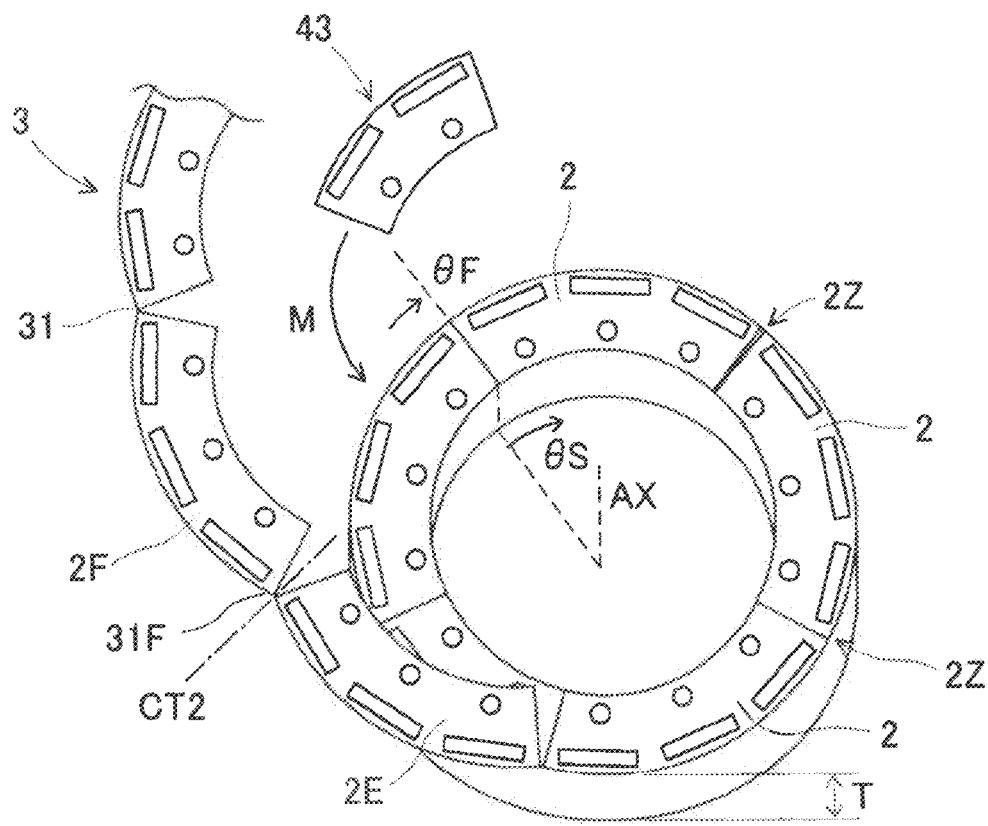
FIG. 8 is a schematic diagram for explaining a phase adjusting method executed at an end of the winding lamination in the phase adjusting process of the second embodiment.

In the adjustment unit core forming process, the unit core having one of the poles 42 and the unit core having two of the poles 43 are produced, and in the unit core forming process, the series of unit cores 3 is produced, and then in the windingly laminating process, the series of unit cores 3 is windingly laminated so as to reach the predetermined thickness T. The winding lamination at this point is illustrated in FIG. 8. FIG. 8 is a diagram for schematically explaining the phase adjusting method at the end of the winding lamination in the phase adjusting process of the second embodiment. The state illustrated in FIG. 8 is similar to that of FIG. 6, however, in the second embodiment, the adjustment unit core is arranged so as to be adjacent to the last unit core 2E, arranged at the last of the winding lamination, in a circumferential direction.

In the example illustrated in FIG. 8, after the series of unit cores 3 is windingly laminated so as to reach the predetermined thickness T, the unit core 2F is arranged so as to exceed the rotational phase θS of the start of the winding lamination by one-third segment, corresponding to the last one magnetic pole, of the unit core 2F. In this case, a cutting is applied to a connecting portion 31F existing between the unit core 2F, arranged so as to exceed the rotational phase BS, and a unit core 2E located immediately before the unit core 2F, by means of a press cutter at a cutting line CT2. Then, the unit core having two poles 43 is arranged so as to be adjacent to the unit core 2E in the circumferential direction as indicated by an arrow M in FIG. 8, the unit core having two poles 43 corresponding to absent segments corresponding to two magnetic poles between the unit core 2E and the rotational phase θS of the start of the winding lamination. Accordingly, the rotational phase θS of the start of the winding lamination and the rotational phase θF of the end of the winding lamination are aligned.

In a case where the absent segment between the last unit core 2E of the winding lamination and the rotational phase θS of the start of the winding lamination corresponds to a segment of one magnetic pole, the unit core having one pole 42 is arranged so as to be adjacent to the last unit core 2E in the circumferential direction. In a case where the rotational phase of the unit core 2F at the end of the winding lamination is aligned to the rotational phase θS of the start of the winding lamination, the unit cores 42 and 43 are not used.

After the rotational phase of the start of the winding lamination and the rotational phase of the end of the winding lamination are aligned, in the same manner as the assembling process of the first embodiment, the plurality of permanent magnets 61 are mounted to the attachment through holes 21, respectively, at the unit cores 2 that are windingly laminated so as to form a cylindrical shape. Then, the end plate 62 is provided so as to contact one end of the winding lamination in the axis of the winding lamination (the axis line AX), and the end plate 63 is provided so as to contact the other end of the winding lamination in the axis of the winding lamination. In this configuration, the sleeves 64 penetrate through the unit cores 2 and the end plates 62 and 63, and a caulking is applied to both end of the sleeves 64 in the direction of the axis line AX, thereby completing the windingly laminated core 1. The windingly laminated core 1 is fixed to the rotor supporting frame 91 by means of the plurality of attachment bolts 65.

According to the manufacturing method of the windingly laminated core 1 of the second embodiment, when the lamination thickness of the unit cores 2 reaches the predetermined thickness T, only in a case where the rotational phase of the end of the winding lamination is not aligned to the rotational phase of the start of the winding lamination, the adjustment unit core (the unit core having one pole 42 or the unit core having two poles 43) is arranged so as to fill the misalignment. Accordingly, the manufacturing process may be simplified, while reducing the manufacturing cost.

In the second embodiment, the unit core having two poles 43 is not formed, and when a segment corresponding to two poles is needed to fill the misalignment, two unit cores having one pole 42 may be provided instead of providing the unit core having two poles 43. The adjustment unit core of "m−1 (m=a number of unit magnetic pole)" types having "1 through (m−1)" numbers of magnetic poles may be formed, or only the adjustment unit cores having one pole are formed, and "1 through (m−1)" numbers of adjustment unit cores are arranged.

The windingly laminated core 1 explained in the embodiments is the laminated core to which the permanent magnets 61 are mounted and used for the rotor 9 of the electric motor 7, however, usages of the windingly laminated core 1 is not limited to this and may be applied to any types of rotary electric machine such as a direct-current machine, an alternate current synchronous machine, an alternate current induction machine and the like. The windingly laminated core 1 may be used for any one of the rotor and the stator and may be a core to which a coil is wound, instead of a magnet embedded therein.

According to the embodiments of this disclosure, the windingly laminated core of the rotary electric machine, having the variable number "n" (e.g., the first number) of magnetic poles in total, is configured by a plurality of the unit cores each of which is formed in an arc and thin plate shape and has the variable number "m" (e.g., the second number) of magnetic poles, the number "m" being a natural number except for an aliquot part of the number "n", wherein a winding lamination is applied to the unit cores in a circumferential direction and in a spiral manner so as to form a cylindrical shape, and a lamination thickness in an axial direction of the winding lamination is set to the predetermined thickness, and wherein an adjustment unit core, formed in the arc and thin plate shape and having at least one of magnetic poles whose number is less than the second number, is provided so as to be adjacent to the unit core arranged at at least one of a start and an end of the winding lamination in a circumferential direction, in order to align the rotational phase of the start of the winding lamination to the rotational phase of the end of the winding lamination.

Accordingly, in a case where the rotational phase of the start of the winding lamination is not aligned to the rotational phase of the end of the winding lamination because of the tolerance of each of the unit cores that may result in increasing or decreasing the number of the unit cores to be used the adjustment unit core is used in order to align the rotational phase of the start of the winding lamination to the rotational phase of the end of the winding lamination, as a result the windingly laminated core may be balanced relative to an axis thereof. In this configuration, the thickness to be controlled to form the lamination may be reduced to the plate thickness of the single unit core, thereby reducing the increment of the length of the electric motor in the axis thereof. Further, the rotational phases of the start and the end of the winding lamination are aligned to each other by use of the adjustment unit core, the windingly laminated core may be formed without providing additional unit cores to be windingly laminated in order to reach the predetermined thickness, thereby reducing the number of the unit cores to be used.

Further, because the number "m" is the natural number except for an aliquot part of the number "n", contacting surface positions at which the unit cores are contacting each other in a circumferential direction are not aligned in an axial direction of the winding lamination, in which a mechanical strength becomes relatively high. Furthermore, because "n" and "m" are prime numbers, the contacting surface positions are arranged so as to be misaligned by one-third segment between adjacent laminations in the axial direction of the winding lamination. In this structure, the contacting surface positions, at which the strength of the winding lamination may be reduced, are aligned in a minimal number in the axial direction of the winding lamination. In a comparative case where a plurality of unit cores, each having the number "m" of magnetic poles, is used for forming the windingly laminated core whose total number of the magnetic poles is "n", wherein "m" is an aliquot part of "n", the contacting surface positions are intensively arranged at, for example magnetic pole border phases of even numbers, and the contacting surface positions are not arranged at magnetic pole border phases of odd numbers. Accordingly, in this comparative case, a level of the mechanical strength at the magnetic pole border phases of even numbers may be reduced compared to the embodiment of this disclosure.

According to the embodiments of this disclosure, the manufacturing method of the windingly laminated core of the rotary electric machine includes the unit core forming process in which the plurality of unit cores are formed, the windingly laminating process in which the winding lamination is applied to the unit cores in the circumferential direction and in the spiral manner and the phase adjusting process in which, after the lamination thickness of the winding lamination reaches the predetermined thickness, the rotational phase of the start of the winding lamination is aligned to the rotational phase of the end of the winding lamination by use of the adjustment unit core formed in the arc and thin plate shape and having at least one of magnetic poles whose number is less than the number "m". Accordingly, by use of the adjustment unit core, the manufacturing method may be simplified, while reducing the manufacturing cost.

According to the embodiments of this disclosure, in the phase adjusting process P3, the unit core, arranged at the end of the winding lamination and whose rotational phase is located so as to exceed the rotational phase of the start of the winding lamination, is cut at a position where the rotational phase of the end of the winding lamination is aligned to the rotational phase of the start of the winding lamination in order to form the adjustment unit core.

Thus, in the phase adjusting process, the unit core, arranged at the end of the winding lamination and whose rotational phase is located so as to exceed the rotational phase of the start of the winding lamination, is cut at a position where the rotational phase of the end of the winding lamination is aligned to the rotational phase of the start of the winding lamination in order to form the adjustment unit core. In this configuration, because the phase adjusting process is executed after the lamination thickness of the winding lamination reaches the predetermined thickness and only when the rotational phase of the start of the winding lamination is not aligned to the rotational phase of the end of the winding lamination by cutting the unit core only at one position, the manufacturing method may be simplified, while reducing the manufacturing cost.

According to the embodiments of this disclosure, the manufacturing method of the windingly laminated core of the rotary electric machine further includes an adjustment unit core forming process in which the adjustment unit core is formed and executed prior to the phase adjusting process, and in the phase adjusting process, the adjustment unit core formed in the adjustment unit core forming process is arranged so as to be adjacent to the unit core arranged at the end of the winding lamination in the circumferential direction.

Thus, the manufacturing method further includes the adjustment unit core forming process in which the adjustment unit core is formed and executed prior to the phase adjusting process, and in the phase adjusting process, the adjustment unit core formed in the adjustment unit core forming process is arranged so as to be adjacent to the unit core arranged at the end of the winding lamination in the circumferential direction. In this configuration, because the phase adjusting process is executed after the lamination thickness of the winding lamination reaches the predetermined thickness and only when the rotational phase of the start of the winding lamination is not aligned to the rotational phase of the end of the winding lamination by arranging the adjustment unit core corresponding to the rotational phase difference between the start and the end of the winding lamination, the manufacturing method may be simplified, while also reducing the manufacturing cost.

According to the embodiments of this disclosure, the plurality of unit cores formed in the unit core forming process is a series of unit cores being partially connected to each other at an outer circumferential surface of each of the unit cores, and the series of unit cores is windingly laminated in the windingly laminating process.

Thus, the plurality of unit cores formed in the unit core forming process is the series of unit cores being partially connected to each other at an outer circumferential surface thereof, and the series of unit cores are windingly laminated in the windingly laminating process. Compared to a case where plural pieces of the unit cores, which are not connected to each other, are arranged piece by piece so as to be windingly laminated, because the series of unit cores, in which the plurality of unit cores are connected to each other, are windingly laminated, the manufacturing process may be simplified, and the manufacturing time may be reduced, while also reducing the manufacturing cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A windingly laminated core of a rotary electric machine, having a first number of magnetic poles in total, the first number being a natural number that is dividable by two, comprising:
   a plurality of unit cores, each of the plurality of unit cores having an arc and thin plate shape and having a second number of magnetic poles, the second number being a natural number except for an aliquot part of the first number and being less than the first number and being equal to or more than three; and
   an adjustment unit core having the arc and thin plate shape;
   wherein a winding lamination is applied to the unit cores in a circumferential direction and in a spiral manner so as to form a cylindrical shape,
   wherein a lamination thickness in an axial direction of the winding lamination is set to a predetermined thickness,
   wherein the adjustment unit core is arranged at at least one of a start and an end of the winding lamination, in a circumferential direction such that a rotational phase of the start of the winding lamination is aligned to correspond to a rotational phase of the end of the winding lamination, and
   wherein the adjustment unit core has a third number of magnetic poles that is less than the second number.

2. The windingly laminated core according to claim 1, wherein the first number of magnetic poles is fourteen.

3. The windingly laminated core according to claim 1, wherein the second number of magnetic poles is three.

4. The windingly laminated core according to claim 1, wherein the second number of magnetic poles is a prime number.

5. The windingly laminated core according to claim 1, wherein the arc and thin plate shape has a thickness of approximately 0.35 millimeters.

6. The windingly laminated core according to claim 1, wherein the adjustment unit core is formed by cutting a last one of the plurality of unit cores.

7. The windingly laminated core according to claim 6, wherein the cutting includes cutting a one-third segment, corresponding to one magnetic pole, of the last one of the plurality of unit cores.

8. The windingly laminated core according to claim 1, wherein prior to arranging the adjustment unit core at the end of the winding lamination, a last one of the plurality of unit cores exceeding the rotational phase of the end of the winding lamination is removed.

9. The windingly laminated core according to claim 1, wherein the adjustment unit core has one magnetic pole.

10. The windingly laminated core according to claim 1, wherein the adjustment unit core has two magnetic poles.

11. The windingly laminated core according to claim 1, wherein the plurality of unit cores are connected to each other by at least one connecting portion.

12. The windingly laminated core according to claim 11, wherein a length of the at least one connecting portion, in a radial direction, is 1 to 3 millimeters.

13. The windingly laminated core according to claim 1, wherein the adjustment unit core is disposed in only one of the start and the end of the winding lamination.

14. The windingly laminated core according to claim 1, wherein the adjustment unit core is disposed adjacent to a last one of the plurality of unit cores.

\* \* \* \* \*